(12) United States Patent
Biancaniello

(10) Patent No.: US 10,630,578 B2
(45) Date of Patent: *Apr. 21, 2020

(54) SYSTEMS AND METHODS FOR SOFTWARE DEFINED NETWORKING SERVICE FUNCTION CHAINING

(71) Applicant: Oath Inc., Dulles, VA (US)

(72) Inventor: Michael P. Biancaniello, Haymarket, VA (US)

(73) Assignee: Oath Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/827,807

(22) Filed: Nov. 30, 2017

(65) Prior Publication Data

US 2018/0083865 A1 Mar. 22, 2018

Related U.S. Application Data

(63) Continuation of application No. 14/564,844, filed on Dec. 9, 2014, now Pat. No. 9,866,472.

(51) Int. Cl.
*H04L 12/725* (2013.01)
*H04L 29/06* (2006.01)
*H04L 12/24* (2006.01)

(52) U.S. Cl.
CPC ...... *H04L 45/306* (2013.01); *H04L 29/06102* (2013.01); *H04L 69/161* (2013.01); *H04L 69/22* (2013.01); *H04L 41/5045* (2013.01)

(58) Field of Classification Search
CPC . H04L 45/306; H04L 29/06102; H04L 69/22; H04L 41/5045
USPC ...................................................... 370/392
See application file for complete search history.

(56) References Cited

U.S. PATENT DOCUMENTS

| | | | | |
|---|---|---|---|---|
| 9,548,896 B2* | 1/2017 | Naiksatam | .......... | H04L 41/0893 |
| 2014/0301396 A1* | 10/2014 | Hong | .......... | H04L 49/25 370/392 |
| 2015/0263946 A1* | 9/2015 | Tubaltsev | .......... | H04L 45/586 370/392 |
| 2015/0281055 A1 | 10/2015 | Lin et al. | | |
| 2015/0319089 A1* | 11/2015 | Liu | .......... | H04L 45/745 370/392 |

OTHER PUBLICATIONS

Blendin, J. et al. "Position Paper: Software-Defined Network Service Chaining." EWSDN 2014, Sep. 2, 2014, Budapest, Hungary.
Hersey, D. "Building a Scalable OpenFlow Network with MAC Based Routing." Virtual Now—Dan Hersey's Blog. Apr. 23, 2012. Retrieved from the Internet: URL: http://virtualnow.net/2012/04/23/building-a-scalable-openflow-network-with-mac-based-routing/.

* cited by examiner

*Primary Examiner* — Christopher R Crompton
(74) *Attorney, Agent, or Firm* — Bookoff McAndrews, PLLC

(57) ABSTRACT

Systems and methods are disclosed for steering packet traffic through an online network. One method includes receiving, at a switch of a network, a packet of data; classifying, by the switch, the packet to a service function chain based on fields of a packet header of the packet, the service function chain including a set of service functions to be performed on the packet; setting, by the switch, fields of the packet header to identify the service function chain classified; and transmitting, by the switch over the network, the packet to a service function device that performs a service function on the packet, the service function being in the set of service functions.

17 Claims, 6 Drawing Sheets

```
dump-flows sb1
     priority=1,ip,nw_src=10.1.0.0/16,nw_dst=10.3.0.0/16
actions=mod_eth_src:5f:5f:5f:cc:00:01,mod_eth_dst:5f:5f:5f:00:00:01,output:5
     priority=1,ip,nw_src=10.1.0.0/16,nw_dst=10.5.0.0/16
actions=mod_eth_src:5f:5f:5f:cc:00:02,mod_eth_dst:5f:5f:5f:00:00:01,output:5
     priority=1,ip,nw_src=10.3.0.0/16,nw_dst=10.5.0.0/16
actions=mod_eth_src:5f:5f:5f:cc:00:02,mod_eth_dst:5f:5f:5f:00:00:01,output:5
     priority=0,actions=output:NORMAL
```

*FIG. 4A*

```
dump-flows sg1
     priority=1,ip,nw_src=10.1.0.0/16,nw_dst=10.3.0.0/16
actions=mod_eth_src:5f:5f:5f:cc:00:01,mod_eth_dst:5f:5f:5f:00:00:01,output:5
     priority=1,ip,nw_src=10.1.0.0/16,nw_dst=10.5.0.0/16
actions=mod_eth_src:5f:5f:5f:cc:00:02,mod_eth_dst:5f:5f:5f:00:00:01,output:5
     priority=1,ip,nw_src=10.3.0.0/16,nw_dst=10.5.0.0/16
actions=mod_eth_src:5f:5f:5f:cc:00:02,mod_eth_dst:5f:5f:5f:00:00:01,output:5
     priority=0,actions=output:NORMAL
```

*FIG. 4B*

```
dump-flows sc1
     priority=1,ip,dl_dst=5f:5f:5f:00:00:01 actions=dec_ttl,output:3
     priority=1,ip,dl_dst=5f:5f:5f:00:00:02 actions=dec_ttl,output:4
     priority=0,actions=output:NORMAL
```

FIG. 5

```
dump-flows sf1
     priority=1,ip,eth_src=5f:5f:5f:cc:00:01
actions=mod_eth_src:12:34:56:78:9a:bc,mod_eth_dst:12:34:56:78:9a:bc,output:NORMAL
     priority=1,ip,eth_src=5f:5f:5f:cc:00:02
actions=mod_eth_dst:5f:5f:5f:00:00:02,output:2
     priority=0,actions=output:NORMAL
```

FIG. 6

```
dump-flows sf2
     priority=1,ip,eth_src=5f:5f:5f:cc:00:02
actions=mod_eth_src:12:34:56:78:9a:bc,mod_eth_dst:12:34:56:78:9a:bc,output:NORMAL
     priority=0,actions=output:NORMAL
```

FIG. 7

SYSTEMS AND METHODS FOR SOFTWARE DEFINED NETWORKING SERVICE FUNCTION CHAINING

CROSS-REFERENCE TO RELATED APPLICATION

This application is a continuation of U.S. patent application Ser. No. 14/564,844, filed Dec. 9, 2014, which is incorporated by reference in its entirety.

TECHNICAL FIELD

This present disclosure relates to systems and methods for using software defined networking to implement service function chaining.

BACKGROUND

Networks typically use various network devices to forward data packets based on destination information in the packet. Network services inspect and alter the packets transiting through the network to ensure that the packets are passed to a network device that is able to respond to the packet. These network devices (also referred to "network services," "service function devices," and/or "services") provide various network functions, such as network address translation, forwarding, classification, caching, virus scanning, firewalling, and/or deep packet inspection.

In order to avoid the unnecessary use of a service, packets (traffic) are steered to a specific set of services instead of passing through every service in a network. Service chaining allows network traffic to be steered to the network services needed by the particular packet and network service. A service chain is an ordered set of network services. Traffic steering is the action of classifying traffic and directing the different classes of traffic through specific service chains.

Traditionally, service chaining has been implemented through tunneling, switching, virtual local area network ("VLAN") mapping, and policy-based routing ("PBR"). Each of these service chaining techniques have various drawbacks, such as integration problems, configuration problems, and/or scaling problems.

SUMMARY OF THE DISCLOSURE

Embodiments disclose systems and methods for steering packet traffic through an online network.

According to certain embodiments, computer-implemented methods are disclosed for steering packet traffic through an online network. One method includes receiving, at a switch of a network, a packet of data; classifying, by the switch, the packet to a service function chain based on fields of a packet header of the packet, the service function chain including a set of service functions to be performed on the packet; setting, by the switch, fields of the packet header to identify the service function chain classified; and transmitting, by the switch over the network, the packet to a service function device that performs a service function on the packet, the service function being in the set of service functions.

According to certain embodiments, systems are disclosed for steering packet traffic through an online network. One system includes a data storage device storing instructions for steering packet traffic through an online network; and a processor configured to execute the instructions to perform a method including: receiving, over a network, a packet of data; classifying the packet to a service function chain based on fields of a packet header of the packet, the service function chain including a set of service functions to be performed on the packet; setting fields of the packet header to identify the service function chain classified; and transmitting, over the network, the packet to a service function device that performs a service function on the packet, the service function being in the set of service functions.

According to certain embodiments, a non-transitory computer readable medium is disclosed that stores instructions that, when executed by a computer, cause the computer to perform a method for steering packet traffic through an online network. One computer-readable medium includes the method of receiving, at a switch of a network, a packet of data; classifying, by the switch, the packet to a service function chain based on fields of a packet header of the packet, the service function chain including a set of service functions to be performed on the packet; setting, by the switch, fields of the packet header to identify the service function chain classified; and transmitting, by the switch over the network, the packet to a service function device that performs a service function on the packet, the service function being in the set of service functions.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A and 4B depict pseudo code in which the addresses of the packet header may be matched and set, according to an exemplary embodiment of the present disclosure;

FIG. 5 depicts pseudo code in which a packet, which may not be transferred according to a service function chain, may be forwarded, according to an exemplary embodiment of the present disclosure;

FIG. 6 depicts pseudo code in which the addresses of the packet header may be matched to forward a packet to the proper destination, according to an exemplary embodiment of the present disclosure;

FIG. 7 depicts additional pseudo code in which the addresses of the packet header may be matched to forward a packet to the proper destination, according to an exemplary embodiment of the present disclosure;

DETAILED DESCRIPTION OF EMBODIMENTS

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

More particularly, the present disclosure relates to routing network traffic through a chain of service functions using repurposed MAC addresses by software defined networking. Some embodiments of the present disclosure will be discussed as using the OpenFlow protocol, but could be implemented with other types of Software Defined Networking ("SDN"). OpenFlow is a communications protocol that gives access to the forwarding plane of a network switch and/or router over the network, and supports multiple tables and a metadata field to exchange information between tables.

For a network service (also referred to as a service), various service functions ("SFs") may be performed to respond to the service requested. The various service functions may be performed in a pre-defined order. The order of the service functions to be performed may be referred to as a service function chain ("SFC"). An SFC may be defined by a network operator through a selection of a specific service function instance to be performed on a specific network node. Each service function may be performed at any layer within a network protocol stack, such as a network layer, transport layer, application layer, etc.

Packets of traffic may initially be classified for handling by a set of SFs in the network, and then may be forwarded to that set of SFs for processing. Classification may include matching a packet header of the packet to a SFC. Once the packet header is matched to an SFC, the classifier may identify an appropriate destination for the packet from the SFC. In the network, the network operator may be one or more defined service policies, which classify traffic and a chain of services that each classification will traverse. These service policies may be translated into service rules to be programmed on network switches in a service network. The service rules may be used to steer network traffic through an ordered chain of network services, as specified by the service policies.

Figure 1:
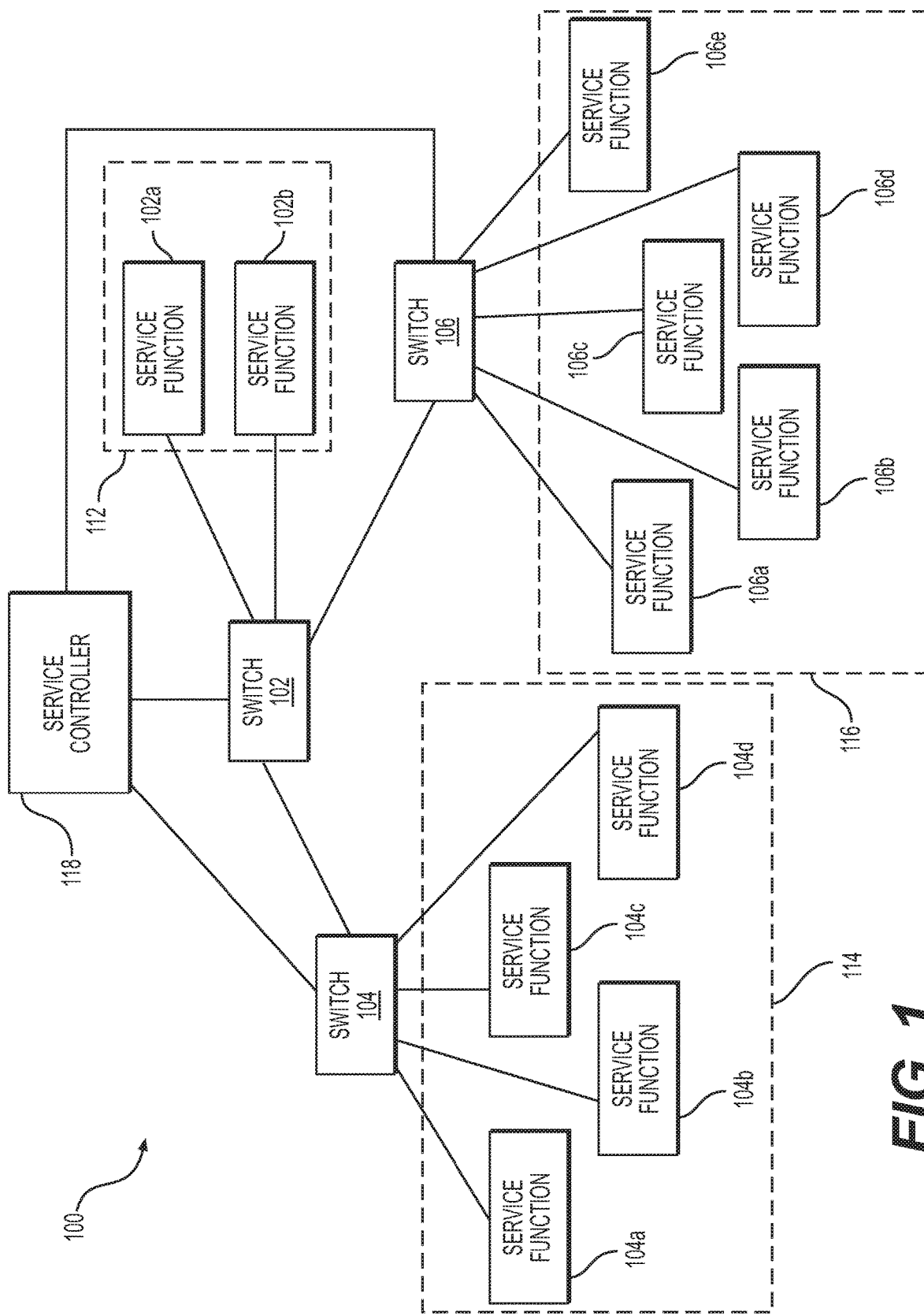
FIG. 1 depicts a schematic diagram of a system and environment in which devices may classify packets of data in a service function chain and perform service functions, according to an exemplary embodiment of the present disclosure.

Referring now to FIG. 1, an example service network 100 including switches 102, 104, and 106. While service network described herein refers to a network including three switches, any network topology may be used in implementing the present disclosure. Each of the switches 102, 104, 106 may be implemented with OpenFlow switches. Switch 102 may be connected to switches 104 and 106, and vice versa. For example, switch 102 may act as forwarder and switches 104 and 106 may act as classifiers.

Service functions 102a and 102b may be provided on a service node 112 which is connected to switch 102. Alternatively, service functions 102a and 102b may be provided on separate service nodes. Service functions 104a, 104b, 104c, and 104d may be provided on a service node 114 which is connected to switch 104. Alternatively, one or more service functions 104a, 104b, 104c, and 104d may be provided on one or more separate service nodes. Service functions 106a, 106b, 106c, 106d and 106e may be provided on a service node 116 which is connected to switch 106. Alternatively, one or more service functions 106a, 106b, 106c, 106d and 106e may be provided on one or more separate service nodes. For example, service functions 102a and 102b may provide functions that filter, log, load balance, perform network address translation, etc. on packets, and then may transmit the packets as appropriate.

When packets arrive at service network 100, the packets may be classified and assigned to a service chain based on predefined policies. After classification, the packets may be forwarded to a "next" service based on its current position along its assigned service function chain. When the "next" service node is connected to another switch, the classification and assignment may be performed again at the receiving switch, if needed.

A service controller 118 may be used to create the traffic steering process through rules that may be set by an operator. The rules may then be transmitted to the switches, such as switches 102, 104, and 106.

As discussed above, a switch may route traffic to the next hop and may set the destination Media Access Control ("MAC") address to ensure that the traffic is delivered to the correct switch. The switch may rewrite the MAC addresses to steer packets toward service functions of a service function chain. Each switch in the network may then direct traffic and send the packets to the next router in the network. Switches may be physical devices. Additionally, and/or alternatively, one or more switches may be virtual switches in a virtual LAN.

The steering mechanism described herein may be implemented using a protocol that supports one or more tables and fields which can be used to exchange information when processing packets through multiple tables. As will be discussed below, each packet header may be modified to include additional information that may identify the service function chain and/or the set of service functions to visit. This additional information may be a label identifying the entire service function chain and/or a set of labels that identifies each service function to visit.

Figure 2:
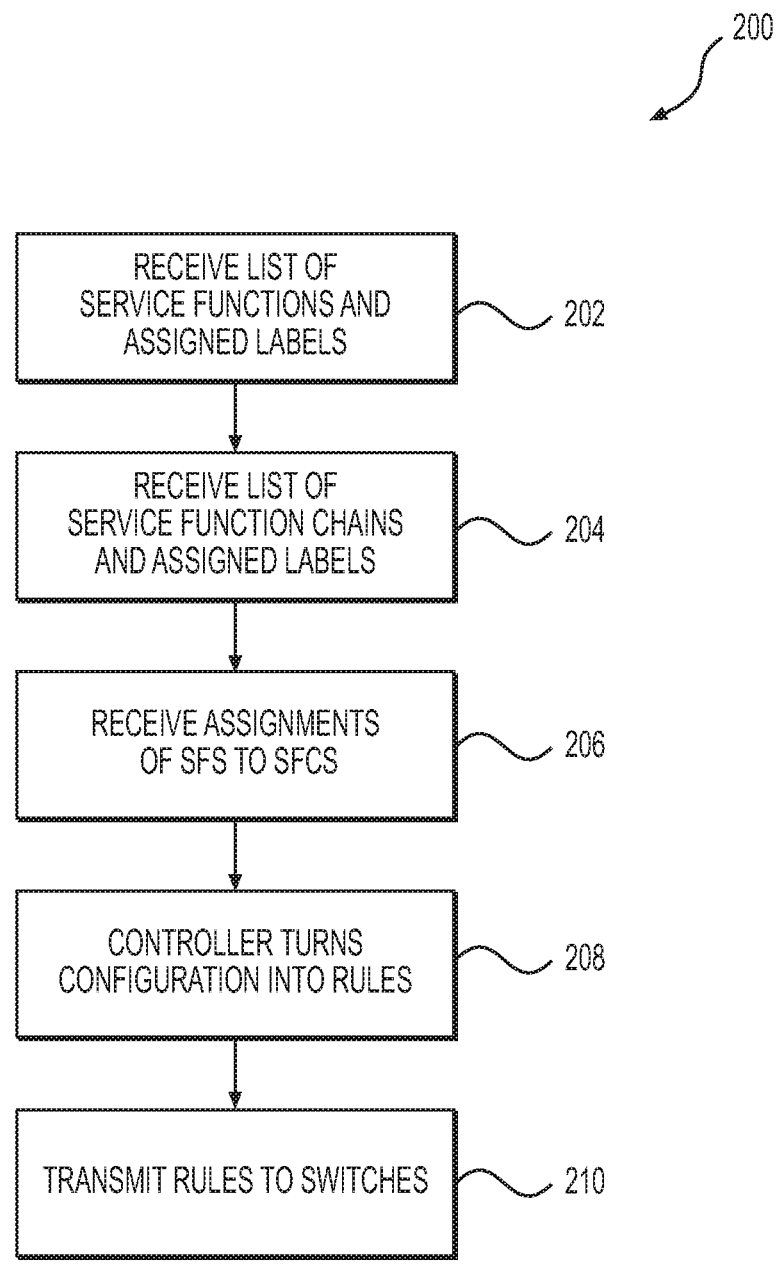
FIG. 2 depicts a flow diagram of an exemplary method of configuring network switches to process software defined network service function chaining, according to an exemplary embodiment of the present disclosure.

As will be described in detail below, packets may be classified and/or labeled when they enter a network. The label may be used to identify the next service function to visit. As shown in FIG. 2, a method is depicted for configuring network switches to process software defined network service function chaining. Method 200 of FIG. 2 may begin at step 202 when a controller, such as controller 118, receives a list of service functions and assigned labels for the service functions. For example, a service function may be sf1, and the service function sf1 may be performed by service function 102a of service node 112. The service function label for service function sf1 may be a Media Access Control ("MAC") address of the service function 102a, such as MAC address 5f:5f:5f:00:00:01. Another service function may be sf2, and the service function sf2 may be performed by service function 102b of service node 112. The service function label for service function sf2 may be the MAC address of service function 102b, such as MAC address 5f:5f:5f:00:00:02. Yet another service function may be hg1, and the service function hg1 may be performed by service function 104a of service node 114. The service function label for service function hg1 may be the MAC address of service function 104a, such as 5f:5f:5e:00:00:01. For each of the service functions, such as services functions 102a, 102b, 104a, 104b, 104c, 104d, 106a, 106b, 106c, 106d, and 106e, the controller, such as controller 118, may receive a service function and a corresponding label, such as the MAC address for the service function.

After the controller has received the list of service functions and corresponding service function labels, the controller, at step 204, may receive a list of service function chains and assigned service function chain labels. For example, a service function chain may be sfc1, and the service function label corresponding to service function chain sfc1 may be a MAC address, such as MAC address 5f:5f:5f:cc:00:01. Another service function chain may be sfc2, and the service function label corresponding to service function chain sfc2 may be a MAC address, such as MAC address 5f:5f:5f:cc:00:02. The controller, such as controller 118, may receive any number of service function chains and corresponding service function chain labels, such as one or more MAC addresses.

Upon the controller receiving the list of service function chains and corresponding service function chain labels, the controller, at step 206, may receive an assignment of one or more service functions to be performed by the service function chain, along with matching criteria to determine whether a packet should perform the service functions of the service function chain. For example, for service function chain sfc1, service function sf1 may be performed when the matching criteria is satisfied. For service function chain sfc2, service function sf1 and service function sf2 may be performed when other matching criteria is satisfied. For sfc1, service function sf1 may be performed when a source IP addresses of a packet matches one or more predetermined source IP addresses and a destination IP address of the packet matches one or more predetermined destination IP addresses. Matching criteria of a service function chain may be, for example, one or more predetermined source IP addresses, one or more predetermined destination IP addresses, and/or one or more predetermined source IP addresses and destination IP addresses.

At step 208, the controller may convert the received information into rules that one or more switches, such as switches 102, 104, and 106, may understand. Then, at step 210, the controller may transmit the rules to the switches.

Figure 3:
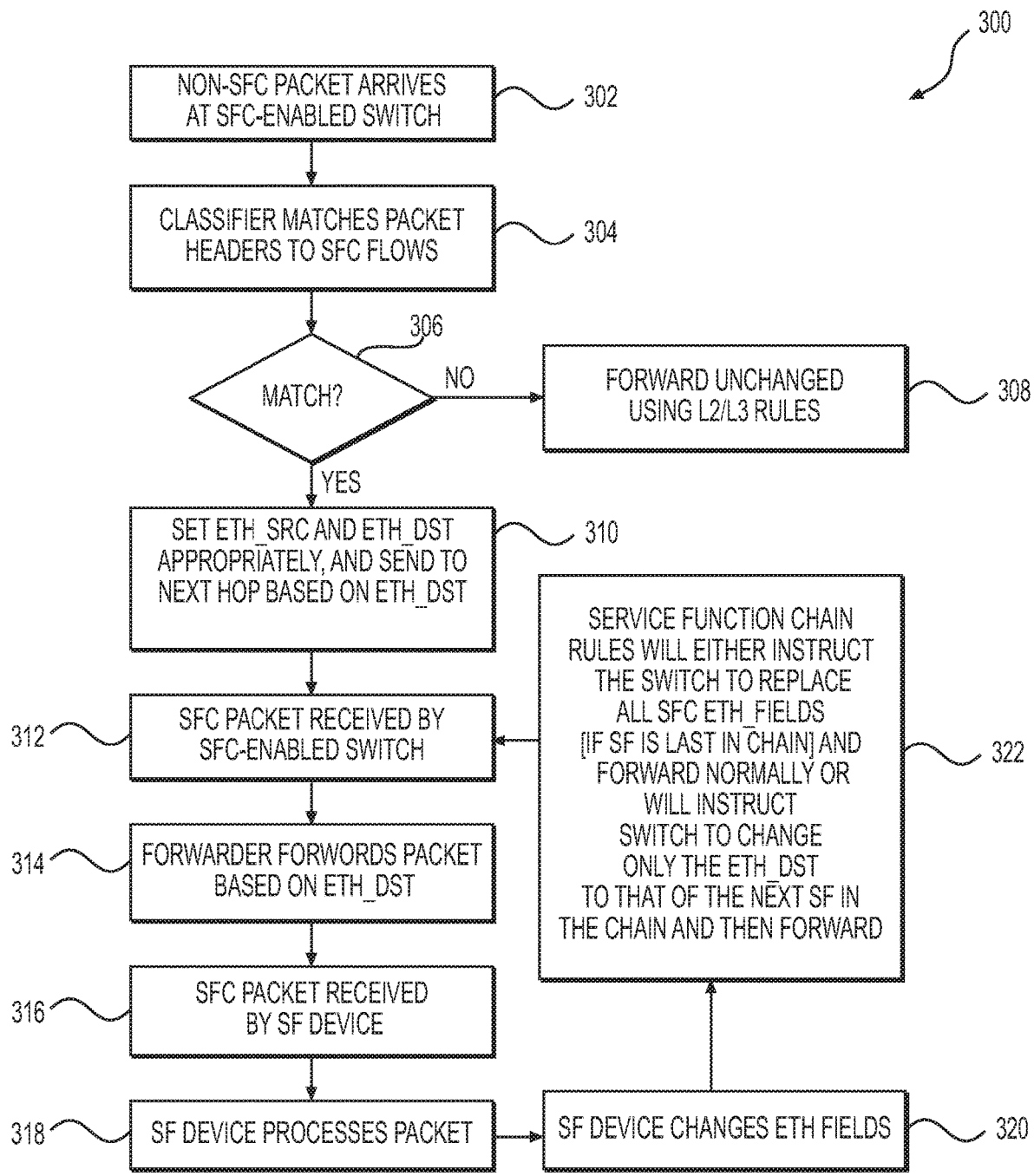
FIG. 3 depicts a flow diagram of an exemplary method of routing network traffic through a chain of service functions using repurposed MAC addresses by software defined networking, according to an exemplary embodiment of the present disclosure.

FIG. 3 depicts a method 300 of routing network traffic through a chain of service functions using repurposed MAC addresses by software defined networking. Method 300 may begin at step 302 in which a packet, such as a not previously processed service function chain packet, arrives at a classifying switch, such as one or more of switches 102, 104, and/or 106, that have been configured to allow service function chaining through software defined networking.

At step 304, the classifying switch may classify the packet header of the packet to a service function chain flow. Then, at step 306, the classifying switch may determine whether fields of the packet header of the packet match one of a matching criteria that was previously setup, such as by method 200, as discussed above. For example, the classifying switch may match service function chain flows based on the source IP address and/or destination IP address of the packet header.

At step 310, if the source IP and/or destination IP address matches one or more of the matching criteria, the classifying switch may set the source MAC address of the packet header to the service function chain label, and set the destination MAC address to the service function label of the first service function in the service function chain. FIGS. 4A and 4B depict pseudo code in which the addresses of the packet header may be matched and set. Once the classifying switch has classified the packet headers, the classifying switch may transmit the packet appropriately.

At step 308, if the source IP address and/or destination IP address does not match one or more of the matching criteria, the switch may forward the packet normally, such as by using the layer-2/layer-3 forwarding table. FIG. 5 depicts pseudo code in which a packet, which may not be transferred according to a service function chain, may be forwarded. As shown in FIG. 5, the pseudo code may be provided to a switch that may be connected to other switches and not connected to service functions. The classified packet may be received at a second switch that has service function chaining enabled, at step 312. The second switch may inspect the packet header and determine whether the second switch should forward the packet to another switch or a service function connected to the second switch by inspecting the destination MAC address of the packet header. If the second switch is not connected to the service function to process the packet, the second switch may forward the packet to another switch. If the service function is connected to the second switch, the second switch may forward the packet to the service function based on the destination MAC address of the packet header, at step 314.

At step 316, the packet may be received by a service function device, such as one of service functions 102a, 102b, 104a, 104b, 104c, 104d, 106a, 106b, 106c, 106d, and/or 106e. At step 318, the service function device may process the packet according to the service function requested, for example, sf1, as discussed above. Then, at step 320, the service function device may set the source MAC address and destination MAC address, if needed.

The method may proceed to step 322, in which the switch connected to the service function may process the packet according to the service function chain. For example, if the packet has been classified to sfc1, as discussed above, and the service function device was sf1, the last hop in the service function chain sfc1 has been completed. The switch may reset the source MAC address and the destination MAC address and then forward the packet normally. If the packet has been classified to sfc2, and the service function was sf1, the switch may set the destination MAC address to the address for sf2, which is the next service function to be performed in the service function chain sfc2. If there is no service function chain information in the packet header, then the switch may forward the packet normally.

FIG. 6 depicts pseudo code in which the addresses of the packet header may be matched to forward a packet to the proper destination. As shown in FIG. 6, a service function sf1 that is included in service function chains sfc1 (sf1) and sfc 2 (sf1→sf2). If the field eth_src matches service function chain sfc1, then a switch may determine that the service function is the last service function in the service function chain. The switch may modify the field eth_dst to point to another switch, such as switch 102 shown in FIG. 1, and forward the packet normally. If the field eth_src indicates that the packet is part of service function chain sfc2, the switch may modify the field eth_dst to point to service function sf2, which is the next hop in the service function chain sfc2, and forwards the packet out. If the field eth_src does not match a known service function chain, then the packet is forwarded normally.

If the packet has been classified to sfc2, and the service function device was sf2, because sf2 was the last hop in the service function chain sfc2, the switch may reset the source MAC address and destination MAC address to remove service function chain information and may forward the packet normally. FIG. 7 depicts additional pseudo code in which the addresses of the packet header may be matched to forward a packet to the proper destination. As shown in FIG. 7, service function sf2 is part of service function chain sfc2 (SF1 SF2). If the field eth_src matches service function chain sfc2, a switch may determine that the service function is the last service function in the service function chain. The switch may modify the field eth_dst to point to another switch, such as switch 102 shown in FIG. 2, and forward the packet normally. If the field eth_src does not match a known service function chain, then the packet is forwarded normally.

Figure 8:
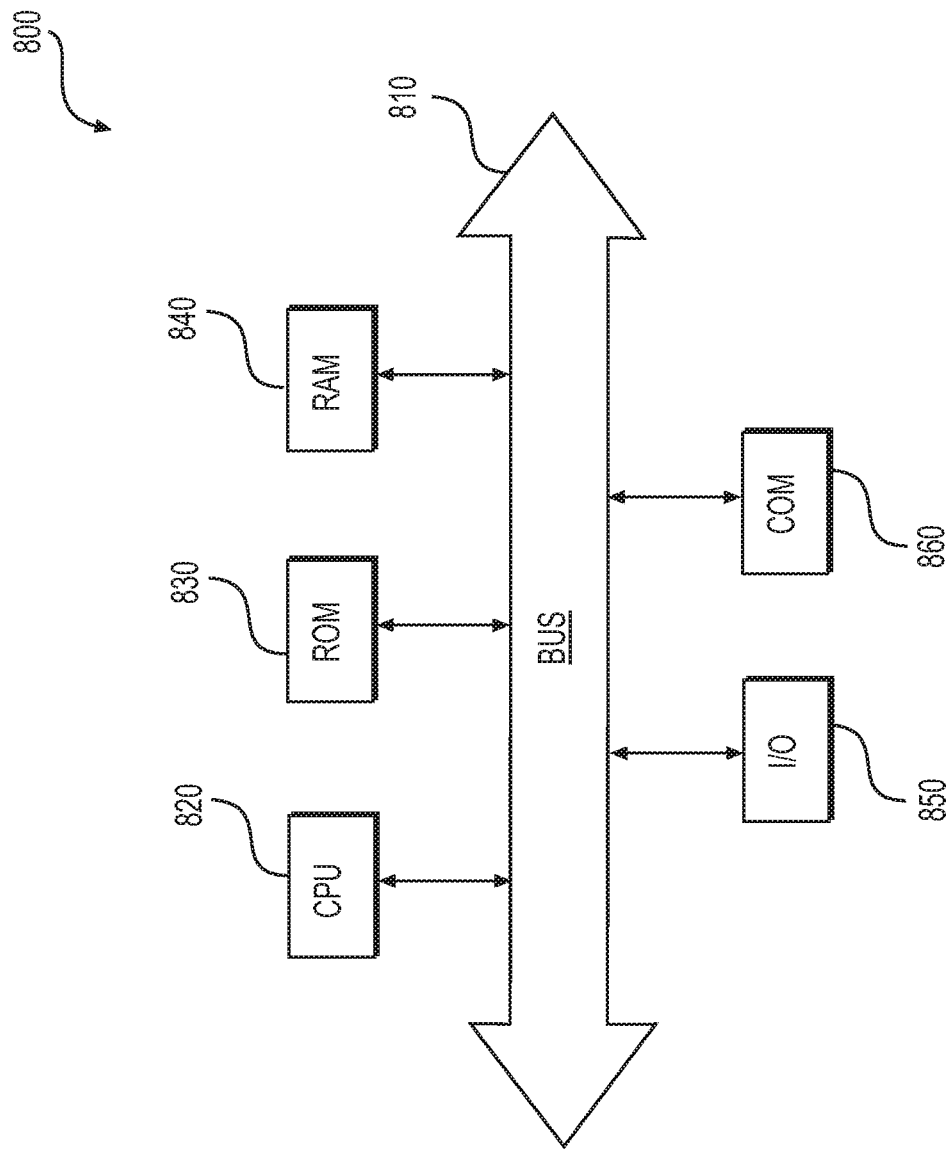
FIG. 8 is a simplified functional block diagram of a computer that may be configured as a device or server for executing the methods of FIGS. 2 and 3 and the pseudo code of FIGS. 4-7, according to exemplary embodiments of the present disclosure.

FIG. 8 is a simplified functional block diagram of a computer that may be configured as switches, controllers, and/or servers for executing the methods, according to exemplary an embodiment of the present disclosure. Specifically, in one embodiment, any of the switches, controllers, and/or servers may be an assembly of hardware 800 including, for example, a data communication interface 860 for packet data communication. The platform may also include a central processing unit ("CPU") 820, in the form of one or more processors, for executing program instructions. The platform typically includes an internal communication bus 810, program storage, and data storage for various data files to be processed and/or communicated by the platform such as ROM 830 and RAM 840, although the system 800 often receives programming and data via network communications 870. The server 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for steering packet traffic through an online network, comprising:
   receiving, at a first switch of the online network, a packet of data, wherein the first switch is enabled for service function chaining, and wherein the packet of data includes a source field and a destination field;
   classifying, by the first switch, the packet of data to a service function chain based on any one of the source field and the destination field of the packet of data, the service function chain including a set of service functions to be performed on the packet of data, the set of service functions including at least a load balancing function for the packet of data;
   transmitting, by the first switch over the online network, the packet of data to a second switch, wherein the second switch is enabled for service function chaining;
   inspecting, by the second switch, any one of the source field and the destination field to determine whether a service function device connected to the second switch is configured to perform at least the load balancing function for the packet of data, the load balancing function being in the set of service functions; and
   wherein if any one of the source field and the destination field matches the matching criteria associated with the service function chain, then transmitting the packet of data to the service function device to perform the load balancing function and a second service function of the set of service functions on the packet of data,
   wherein if any one of the source field and the destination field does not match the matching criteria associated with the service function chain,
   then resetting any one of the source field and the destination field for transmitting the packet of data to a third switch according to a forwarding table, wherein the forwarding table comprises a layer-3 forwarding table.

2. The method of claim 1, wherein setting any one of the source field and the destination field of the packet of data to identify the service function chain classified by the first switch includes:
   modifying, by the first switch, a source Media Access Control ("MAC") field to identify the service function chain classified by the first switch.

3. The method of claim 2, further comprising:
   modifying, by the first switch, a destination MAC field to identify a MAC address of the first service function of the set of service functions of the service function chain.

4. The method of claim 1, further comprising:
receiving, by the first switch, a list of service functions and corresponding service function labels.

5. The method of claim 4, further comprising:
receiving, by the first switch, a list of service function chains, each service function chain including a set of service functions from the list of service functions and matching criteria to identify packets of data to be classified.

6. The method of claim 4, wherein the corresponding service function labels comprise a Media Access Control ("MAC") address of a corresponding service function.

7. A system for steering packet traffic through an online network, the system including:
a data storage device that stores instructions for steering packet traffic through the online network; and
a processor configured to execute the instructions to perform a method including:
receiving, at a first switch over the online network, a packet of data, wherein the first switch is enabled for service function chaining, and wherein the packet of data includes a source field and a destination field;
classifying, by the first switch, the packet of data to a service function chain based on any one of the source field and the destination field of the packet of data, the service function chain including a set of service functions to be performed on the packet of data, the set of service functions including at least a load balancing function for the packet of data;
transmitting, by the first switch over the online network, the packet of data to a second switch, wherein the second switch is enabled for service function chaining;
inspecting, by the second switch, any one of the source field and the destination field to determine whether a service function device connected to the second switch is configured to perform at least the load balancing function for the packet of data, the load balancing function being in the set of service functions; and
wherein if any one of the source field and the destination field matches the matching criteria associated with the service function chain, then transmitting the packet of data to the service function device to perform the load balancing function and a second service function of the set of service functions on the packet of data,
wherein if any one of the source field and the destination field does not match the matching criteria associated with the service function chain,
then resetting any one of the source field and the destination field for transmitting the packet of data to a third switch according to a forwarding table, wherein the forwarding table comprises a layer-3 forwarding table.

8. The system of claim 7, wherein setting any one of the source field and the destination field of the packet of data to identify the service function chain classified by the first switch includes:
modifying, by the first switch, a source Media Access Control ("MAC") field to identify the service function chain classified by the first switch.

9. The system of claim 8, wherein the processor is further configured to execute the instructions to perform the method including:
modifying, by the first switch, a destination MAC field to identify a MAC address of the first service function of the set of service functions of the service function chain.

10. The system of claim 7, wherein the processor is further configured to execute the instructions to perform the method including:
receiving, by the first switch, a list of service functions and corresponding service function labels.

11. The system of claim 10, wherein the processor is further configured to execute the instructions to perform the method including:
receiving, by the first switch, a list of service function chains, each service function chain including a set of service functions from the list of service functions and matching criteria to identify packets of data to be classified.

12. The system of claim 10, wherein the corresponding service function labels comprise a Media Access Control ("MAC") address of a corresponding service function.

13. A non-transitory computer-readable medium storing instructions that, when executed by a computer, cause the computer to perform a method for steering packet traffic through an online network, the method including:
receiving, at a first switch of the online network, a packet of data, wherein the first switch is enabled for service function chaining, and wherein the packet of data includes a source field and a destination field;
classifying, by the first switch, the packet of data to a service function chain based on any one of the source field and the destination field of the packet of data, the service function chain including a set of service functions to be performed on the packet of data, the set of service functions including at least a load balancing function for the packet of data;
transmitting, by the first switch over the online network, the packet of data to a second switch, wherein the second switch is enabled for service function chaining;
inspecting, by the second switch, any one of the source field and the destination field to determine whether a service function device connected to the second switch is configured to perform at least the load balancing function for the packet of data, the load balancing function being in the set of service functions; and
wherein if any one of the source field and the destination field matches the matching criteria associated with the service function chain, then transmitting the packet of data to the service function device to perform the load balancing function and a second service function of the set of service functions on the packet of data,
wherein if any one of the source field and the destination field does not match the matching criteria associated with the service function chain,
then resetting any one of the source field and the destination field for transmitting the packet of data to a third switch according to a forwarding table, wherein the forwarding table comprises a layer-3 forwarding table.

14. The computer-readable medium of claim 13, wherein setting any one of the source field and the destination field of the packet of data to identify the service function chain classified by the first switch includes:
modifying, by the first switch, a source Media Access Control ("MAC") field to identify the service function chain classified by the first switch.

15. The computer-readable medium of claim 13, further comprising:

modifying, by the first switch, a destination MAC field to identify a MAC address of the first service function of the set of service functions of the service function chain.

16. The computer-readable medium of claim 13, further comprising:

receiving, by the first switch, a list of service functions and corresponding service function labels.

17. The computer-readable medium of claim 16, further comprising:

receiving, by the first switch, a list of service function chains, each service function chain including a set of service functions from the list of service functions and matching criteria to identify packets to be classified.

* * * * *